T. F. BABER.
EYEGLASSES.
APPLICATION FILED FEB. 17, 1910.
986,795.
Patented Mar. 14, 1911.
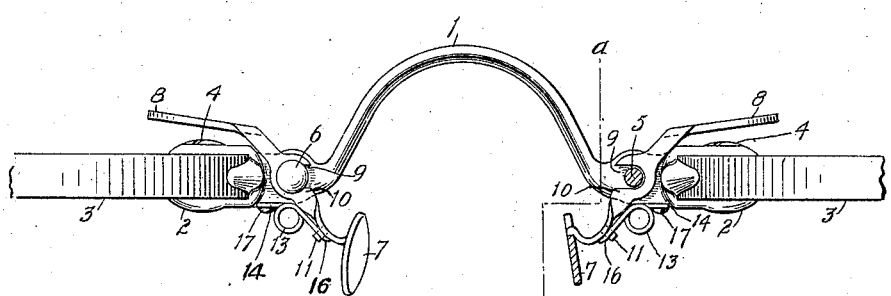
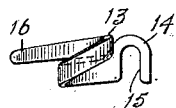
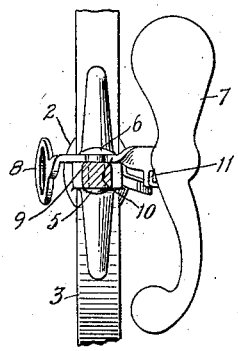
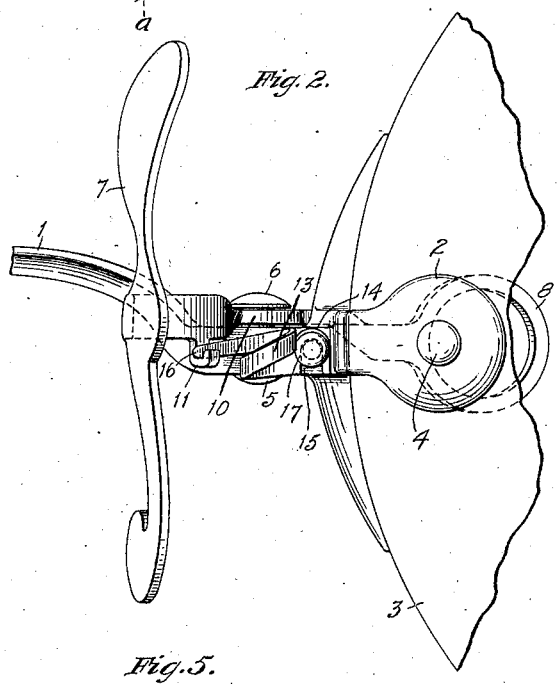
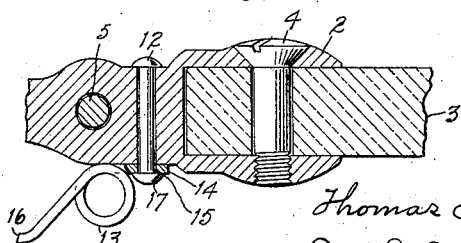
Witnesses:
Inventor.
Thomas F. Baber
By A. O. Behel
Atty.

UNITED STATES PATENT OFFICE.

THOMAS F. BABER, OF ROCKFORD, ILLINOIS.

EYEGLASSES.

986,795.     Specification of Letters Patent.     Patented Mar. 14, 1911.

Application filed February 17, 1910. Serial No. 544,472.

*To all whom it may concern:*

Be it known that I, THOMAS F. BABER, a citizen of the United States, residing at Rockford, in the county of Winnebago and State of Illinois, have invented certain new and useful Improvements in Eyeglasses, of which the following is a specification.

The object of this invention is to connect the guards of eye glasses with a spring which has a quick detachable connection with a guard and with the support for the lens.

In the accompanying drawings, Figure 1 is a top view partially in section of eye glasses containing my improvements. Fig. 2 is a face representation of one half of the eye glasses. Fig. 3 is a section on dotted line *a a* Fig. 1. Fig. 4 is a representation of the spring. Fig. 5 is a section through the strap showing the connection of the spring therewith.

As both lenses and their mountings are of the same construction, a description of one will answer. The bridge 1 connects the two straps 2 of the two lenses 3, and the straps are connected to the lenses 3 by the usual screw 4. At the junction of the bridge with a strap is located a rivet 5 which has one head 6 projecting beyond the face of the support for the rivet. A guard 7 has a finger piece 8 formed integral therewith and a notch 9 is formed in the shank portion 10 between the guard and finger piece. This notch 9 receives the rivet 5 and is passed beneath the head 6 of the same. From the shank portion of the guard extends an upwardly extending hook 11 clearly shown at Fig. 2. A rivet 12 is located near the strap 2, and is located parallel with the screw 4 connecting the lens 3 with the strap. A spring is employed to connect the shank of the guard with the rivet 12, and comprises the center coiled section 13, and end 14 with the slot 15, and the end 16 extending tangential from the coiled section. The slot 15 receives the rivet 12 beneath the head 17 thereof, and the end 16 is located in the hook 11 extending from the shank portion of the guard. The spring is readily removable by disengaging it from the rivet 12 and the hook 11. The coiled portions 13 of the springs will impart to the guards the necessary force to hold the glasses in engagement with the nose of the wearer. The finger pieces 8 when moved toward one another will separate the guards sufficiently to allow them to be placed in position.

I claim as my invention.

1. In eye glasses, the combination with a bridge member, a guard member and a pivot connecting the members, said bridge member having a headed post and the guard member being provided with an open hook, of a spring having a coil disposed at one side of the pivot and having one end portion provided with an open ended hook that detachably engages about the post behind the head and having its other end portion detachably engaged in the open ended hook of the guard.

2. In eye glasses, the combination with a bridge member having outstanding angularly disposed headed posts, of a guard having a shank provided with an open hook that detachably engages and is pivotally mounted on one of the posts between the head and the bridge member, said guard also having an open hook, and a coiled spring provided with a terminal open hook that engages the other post between its head and the bridge member, said spring also having an end that detachably engages the hook of the guard.

In testimony whereof I have hereunto set my hand in presence of two subscribing witnesses.

THOMAS F. BABER.

Witnesses:
A. O. BEHEL,
E. D. E. N. BEHEL.

Copies of this patent may be obtained for five cents each, by addressing the "Commissioner of Patents, Washington, D. C."